United States Patent
Wu et al.

(10) Patent No.: US 8,542,622 B2
(45) Date of Patent: Sep. 24, 2013

(54) DELIVERY OF MULTICAST DATA

(75) Inventors: Yicheng Wu, Shanghai (CN); Emer Chen, Shanghai (CN); Robbie Ling, Shanghai (CN); Jinyang Xie, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 352 days.

(21) Appl. No.: 12/919,068

(22) PCT Filed: Feb. 25, 2008

(86) PCT No.: PCT/EP2008/052270
§ 371 (c)(1),
(2), (4) Date: Aug. 24, 2010

(87) PCT Pub. No.: WO2009/106127
PCT Pub. Date: Sep. 3, 2009

(65) Prior Publication Data
US 2010/0329172 A1 Dec. 30, 2010

(51) Int. Cl.
*H04H 20/71* (2008.01)
(52) U.S. Cl.
USPC ............................................... 370/312
(58) Field of Classification Search
USPC ....................................................... 370/312
See application file for complete search history.

(56) References Cited

U.S. PATENT DOCUMENTS

| | | | | |
|---|---|---|---|---|
| 6,189,039 B1 * | 2/2001 | Harvey et al. | ................. | 709/232 |
| 6,523,696 B1 * | 2/2003 | Saito et al. | .................... | 709/223 |
| 7,925,778 B1 * | 4/2011 | Wijnands et al. | ............ | 709/238 |
| 2006/0034202 A1 * | 2/2006 | Kuure et al. | .................. | 370/312 |
| 2006/0056427 A1 * | 3/2006 | Sato | ............................. | 370/401 |
| 2006/0092901 A1 * | 5/2006 | Parantainen | ................. | 370/342 |
| 2006/0291472 A1 * | 12/2006 | Guo et al. | ................. | 370/395.5 |
| 2007/0025301 A1 * | 2/2007 | Petersson et al. | ............ | 370/338 |
| 2007/0116051 A1 * | 5/2007 | Chen | ............................. | 370/469 |
| 2010/0329172 A1 * | 12/2010 | Wu et al. | ....................... | 370/312 |

OTHER PUBLICATIONS

Thaler, D. et al. "Automatic IP Multicast without Explicit Tunnels (AMT)." IETF Network Working Group, Internet-Draft, Intended status: Standards Track, Expires: Apr. 5, 2008. Oct. 3, 2007.
Westerlund, M. et al. "SDP and RTSP Extensions Defined for 3GPP Packet-switched Streaming Service and Multimedia Broadcast/Multicast Service." IETF Network Working Group, Internet Draft, Expires: Jan. 2008, Intended Status: Informational. Jul. 6, 2007.
Palat, S. K, et al. "Multicasting in UMTS." 3G Mobile Communication Technologies, Conference Publication No. 489, May 8-10, 2002.

(Continued)

*Primary Examiner* — Mark Rinehart
*Assistant Examiner* — Kenneth P Hunt
(74) *Attorney, Agent, or Firm* — Coats & Bennett, P.L.L.C.

(57) ABSTRACT

A method and apparatus are provided for delivering multicast media in a network in which at least some nodes do not support delivery of multicast packets. A RTSP SETUP request is sent to a streaming server to send multicast packets, encapsulated within unicast wrappers, to a gateway node in the network. The RTSP SETUP request includes details both of the multicast destination address, and of the unicast destination address of the gateway node, requiring an extension to the RTSP protocol as currently defined and enabling the media server to send multicast packets in a unicast tunnel dynamically.

14 Claims, 6 Drawing Sheets

(56) References Cited

OTHER PUBLICATIONS

Parnes, P. et al. "Lightweight Application Level Multicast Tunnelling using mTunnel." Computer Communications, Elsevier Science Publishers BV, Amsterdam, NL, vol. 21, No. 15, Oct. 1, 1998.

Zhang, B. et al. "Host Multicast: a Framework for Delivering Multicast to End Users." Proceedings of IEEE INFOCOM, Jun. 23, 2002.

Schulzrinne, H. et al. "Real Time Streaming Protocol (RTSP)." IETF Network Working Group, Request for Comments: 2326, Category: Standards Track. Apr. 1998.

3rd Generation Partnership Project. 3GPP TS 23.246, V7.4.0 (Sep. 2007). 3rd Generation Partnership Project; Technical Specification Group Services and System Aspects; Multimedia Broadcast/Multicast Service (MBMS); Architecture and functional description (Release 7). Sep. 2007.

3rd Generation Partnership Project. 3GPP TS 23.246, V8.2.0 (Jun. 2008). 3rd Generation Partnership Project; Technical Specification Group Services and System Aspects; Multimedia Broadcast/Multicast Service (MBMS); Architecture and functional description (Release 8). Jun. 2008.

\* cited by examiner

DELIVERY OF MULTICAST DATA

TECHNICAL FIELD

The present invention relates to a method and apparatus for delivering multicast data. In particular, the invention relates to the delivery of IP multicast data over networks where some of the nodes do not support the routing of multicast data.

BACKGROUND

IP multicast is a mechanism for efficiently delivering IP content to end users ("clients") from a source. IP multicast differs from unicast (one-to-one delivery) and broadcast (one-to-all delivery) in that it makes use of network based multicast routers (MCs) to distribute a single incoming IP stream to a set of clients and/or further MCs which belong to a given multicast group. IP multicast is considered an excellent technology for the delivery of bandwidth hungry services such as IP television (IPTV).

One of the key concepts of IP multicast is that of the multicast group address. Clients wishing to receive multicast content would join an IP multicast group via Internet Group Management Protocol (IGMP), in order to register with an upstream MC. MCs themselves generally use Protocol Independent Multicast (PIM) to set up a multicast distribution tree in a hierarchical structure. A sender can then simply send packets towards this IP multicast group address, so that all the clients registered in that group would receive those packets. In the multimedia domain, most of the time, multimedia content is framed in Real Time Protocol (RTP) packets, which run on top of User Datagram protocol (UDP) to be multicast delivered.

IP television (IPTV) is the name given to a range of services which allow television to be delivered over an IP network. Due to the flexible nature of an IP network, IPTV will allow for a much more personalised service to users, e.g. video-on-demand, with information delivered to users over unicast or multicast IP streams. Currently the predominant way of controlling these streams is to use the Real Time Streaming Protocol (RTSP), defined in IETF RFC 2326. RTSP does not specify a transport protocol but may be used, for example, to establish and control RTP media streams. RTSP is in many ways similar to the HTTP protocol used to request and exchange information over the Internet, but is tailored for streaming media such as audio and video. RTSP allows for a client to request particular media streams from a streaming server, and specifies commands such as PLAY and PAUSE. It does not deliver the continuous streams itself; instead, it controls the streaming servers for delivery.

Thus RTSP supports both unicast or multicast mode, with the selection depending on the network destination address. In unicast mode, the media is transmitted to a requested destination and port number chosen by the client. In multicast mode, server multicast data is transmitted towards a specific multicast address. The multicast IP address and port information could be decided by server or client.

For data delivery, most real-time media uses the RTP as a transport protocol, although RTSP is not tied to RTP. RTP provides end-to-end delivery services for streaming delivery with real-time characteristics, and consists of two parts. The RTP carries data with real-time characteristics, while the RTP Control Protocol (RTCP) monitors the quality of service and conveys information in an on-going session.

It is expected that users of mobile terminals such as mobile telephones will wish to avail themselves of IPTV services. Indeed, this is probably key to the business models of network operators currently installing high capacity cellular networks such as 3G networks. Mobile TV brings TV services to the mobile screen, but is more than traditional TV moved to a tiny screen. It provides the user with the freedom to watch TV content whenever and wherever he is. Besides watching live TV channels and video clips, Mobile TV also provides more interactive TV experience than traditional TV, such as voting and chatting. As the usage of mobile TV grows, cellular networks can be upgraded to meet mass-market demand.

Mobile TV is currently offered via streaming technology over point-to-point connections. In such situations, data packets are transmitted to a signal destination. Large-scale market deployment of Mobile TV will require new network capabilities of point-to-multipoint connections. This will require the support of both networks and mobile terminals. Using point-to-multipoint connections, data packets can be simultaneously transmitted to multiple destinations.

FIGS. 1 and 2 illustrate unicast (point-to-point) and multicast (point-to-multipoint) delivery of data packets of one TV channel in a cellular network. FIG. 1 is a schematic representation of elements of a network delivering a TV channel using unicast packets. A Mobile TV provider 101 sends packets across a backbone network towards a Gateway GPRS Support Node (GGSN) 102. The GGSN identifies the addresses and locations of users subscribed to the TV channel, and forwards the packets to various Serving GPRS Support Nodes (SGSN) 103, 104. The SGSNs 103, 104 route the packets through radio networks 105, 106, 107 towards end users using mobile terminals 111-118. Each end user requires its own stream of data, and therefore eight streams must be sent from the mobile TV provider 101, and four from the GGSN 102 to each SGSN 103, 104. Many streams of data are sent into each radio network 105-106. It will be appreciated that this results in very inefficient usage of network resources.

FIG. 2 is a schematic representation of elements of the same network delivering a TV channel using multicast packets. The backbone network 102, radio networks 105, 106, 107 must all support the use of multicast packets, and the gateway nodes must be able to route multicast packets. The mobile TV provider 101 need only transmit a single stream of multicast data packets. Each gateway node recognises that the packets are multicast, and forwards the same stream of data to more than one recipient. This ensures a more efficient use of network resources, but requires that all points in the network can deal with multicast data packets.

Within cellular networks, point-to-multipoint transmission is now essentially based on IP multicast. The introduction of the 3GPP Multimedia Broadcast/Multicast Service (MBMS) (3GPP TS 23.246) in GSM and UMTS cellular networks standardises the architecture and provides techniques for optimized transmission of a MBMS bearer service such as point-to-multipoint transmission, selective combining and transmission mode selection between Point-to-Multipoint (PTM) and Point-to-Point (PTP) bearers. It enables the efficient usage of radio-network and core-network resources, with an emphasis on radio interface efficiency.

In MBMS, the term "Broadcast" refers to the ability to delivery content to all users. In a cellular network, this means that a Mobile TV service would be broadcast to all mobile terminals in the cells of defined Service Area. Multicast, on the other hand, refers to services that are delivered only to users who have joined a particular multicast group. In a cellular network, this means that the service is delivered only to mobile terminals that have signed up. There is a clear need for MBMS to be introduced into Mobile TV.

In 3GPP, a logic component called the Broadcast-Multicast Service Centre (BM-SC) provides MBMS functionalities in the service layer for the Mobile TV provider. The BM-SC provides five main functionalities: membership; security; session and transmission; proxy and transport; and service announcement.

3GPP release 6 specifies that the BM-SC should send multicast IP packets towards a GGSN. However, in some cases, the GGSN may not support multicast operations. Therefore another option has been proposed in 3GPP release 7 to address this situation. IP multicast packets may be encapsulated inside IP unicast packets by the BM-SC for sending towards the GGSN. This is known as IP-in-IP and is described in IETF RFC 2003.

There is therefore a need to enable a media server to send multicast packets in a unicast tunnel dynamically. There is a further need to provide the control the encapsulation and recovery of IP multicast packets in unicast packets. There is a further need to control such encapsulation and recovery using the RTSP.

SUMMARY

The invention proposes a way to extend the RTSP protocol, enabling media server to send multicast packets in unicast tunnel dynamically.

In accordance with a first aspect of the present invention there is provided a method of controlling the delivery of multicast media in a network in which at least some nodes do not support delivery of multicast packets. The method comprises sending a request to a media server to send multicast packets, encapsulated within unicast wrappers, to a gateway node in the network. The request includes details of a multicast destination address, and details of a unicast destination address of the gateway node.

The request is preferably formulated according to RTSP, and is preferably a RTSP SETUP message, although it will be appreciated that other protocols and initiation messages may also be used. The details of the multicast destination address and gateway node unicast destination address are preferably included in the Transport header and an extension header of the request.

In one embodiment, the media server may be a streaming server in an IP network, in which case the request to the streaming server is preferably sent by the gateway node. The gateway node may, for example, be the gateway node of a LAN and capable of forwarding multicast data streams to client terminals within the LAN. In this case, the multicast destination address should be included in an extension to the Transport header of the RTSP message.

In another embodiment, the media server may be a Mobile TV server (traffic handling component in a BM-SC), in which case the request may be sent by a Broadcast Controller (signal handling component in the BM-SC), and the gateway node may be a GGSN. In this case, it is the GGSN unicast destination address which will be included in an extension to the Transport header of the RTSP message.

Once the request has been made for multicast packets, encapsulated within unicast wrappers, to be sent to the gateway node, the media server may preferably encode streaming data in multicast packets having the multicast destination address and then encapsulate the multicast packets within unicast wrappers to form unicast packets having the gateway node unicast destination address. The unicast packets are then sent to the gateway node. The gateway node removes the unicast wrappers to recover the multicast packets and sends the multicast packets towards the multicast destination address.

In accordance with a second aspect of the present invention there is provided a gateway node for delivering IP multicast data in a network. The gateway node comprises a receiver for receiving instructions from client terminals to subscribe to a multicast channel. A processor is operatively connected to the receiver and configured to generate a request (preferably a RTSP message) to a streaming server for multicast packets encapsulated within unicast wrappers, the request including details of a multicast destination address and a unicast destination address of the gateway node. A transmitter is operatively connected to the processor and configured to send the request towards the streaming server.

In accordance with a third aspect of the present invention there is provided a BCC component of a BM-SC. The BCC comprises a receiver for receiving instructions from a GGSN to set up multicast streaming delivery to a multicast destination address. A processor is operatively connected to the receiver and configured to generate a request (preferably a RTSP message) to a Mobile TV server component of the BM-SC for multicast packets encapsulated within unicast wrappers to be sent to the GGSN. The request includes details of a multicast destination address and the unicast destination address of the GGSN. A transmitter is operatively connected to the processor and configured to send the request towards the Mobile TV server.

In accordance with a fourth aspect of the present invention there is provided a media server for delivering multicast streaming media data. The media server comprises a receiver for receiving a request (preferably a RTSP message) to send multicast packets encapsulated within unicast wrappers towards a gateway node, the request including details of a multicast destination address, and of a unicast destination address of the gateway node. A processor is configured to encode the media data in multicast packets and encapsulate the multicast packets within unicast wrappers as unicast packets. A transmitter is configured to send the unicast packets towards the gateway node.

DETAILED DESCRIPTION

The following description sets forth specific details, such as particular embodiments, procedures, techniques, etc. for purposes of explanation and not limitation. In some instances, detailed descriptions of well known methods, interfaces, circuits, and devices are omitted so as not obscure the description with unnecessary detail. Moreover, individual blocks are shown in some of the drawings. It will be appreciated that the functions of those blocks may be implemented using individual hardware circuits, using software programs and data, in conjunction with a suitably programmed digital microprocessor or general purpose computer, using application specific integrated circuitry, and/or using one or more digital signal processors.

A brief description of some of the features of the Real Time Streaming Protocol (RTSP) will aid in understanding embodiments of the invention. The RTSP is widely used as a control protocol in the streaming world. It is responsible for establishing and controlling one or several time-synchronized audio/video streams. It does not deliver the continuous streams itself; instead, it controls the streaming servers for the delivery.

Commands specified in the RTSP include the following:
1. DESCRIBE. This is used to retrieve the description (e.g. encodings, network addresses, etc.) of a presentation or media object. Usually, the Session Description Protocol (SDP) (defined in IETF RFC 2327) is used to define the format of the presentation description. The SDP information could also be retrieved via HTTP download or other session announcement method.
2. SETUP: This is used to allocate resources for stream delivery and start a session. If several media streams are involved in the session, they need to be setup separately.
3. PLAY: This is used to start data transmission on one or more streams allocated via SETUP
4. PAUSE: This is used to halt a stream temporarily, without freeing the resources allocated to that stream.
5. TEARDOWN: This is used to stop data transmission and free resources associated with streams.

Other commands defined in RTSP protocol include OPTIONS, ANNOUNCE, RECORD, GET_PARAMETER, SET_PARAMETER and REDIRECT.

Mobile TV

Figure 1:
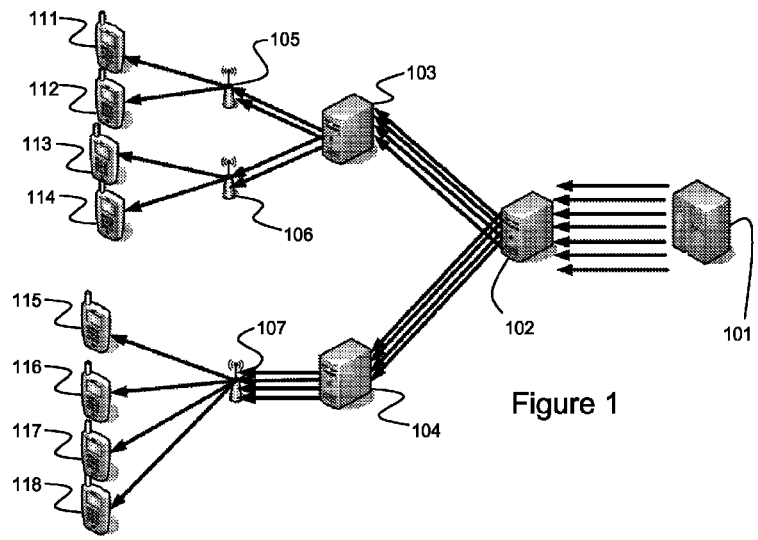
FIG. 1 is a schematic representation of elements of a network delivering a TV channel using unicast packets.
Figure 2:
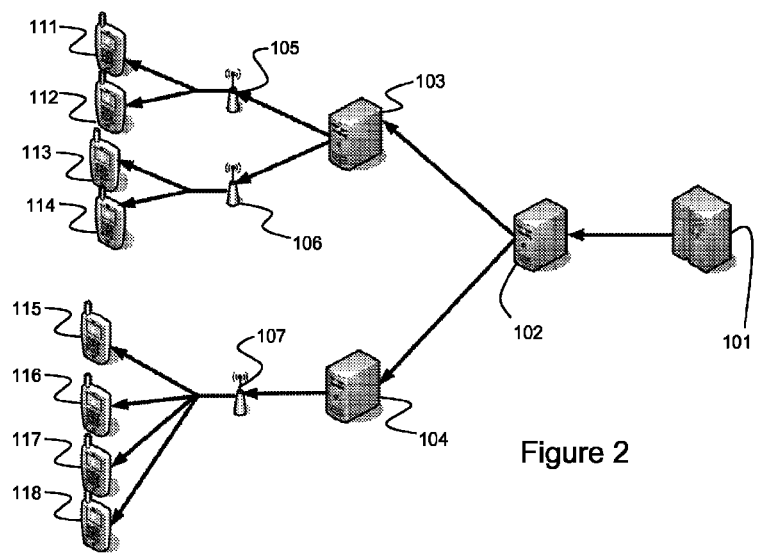
FIG. 2 is a schematic representation of elements of the same network delivering a TV channel using multicast packets.
Figure 3:
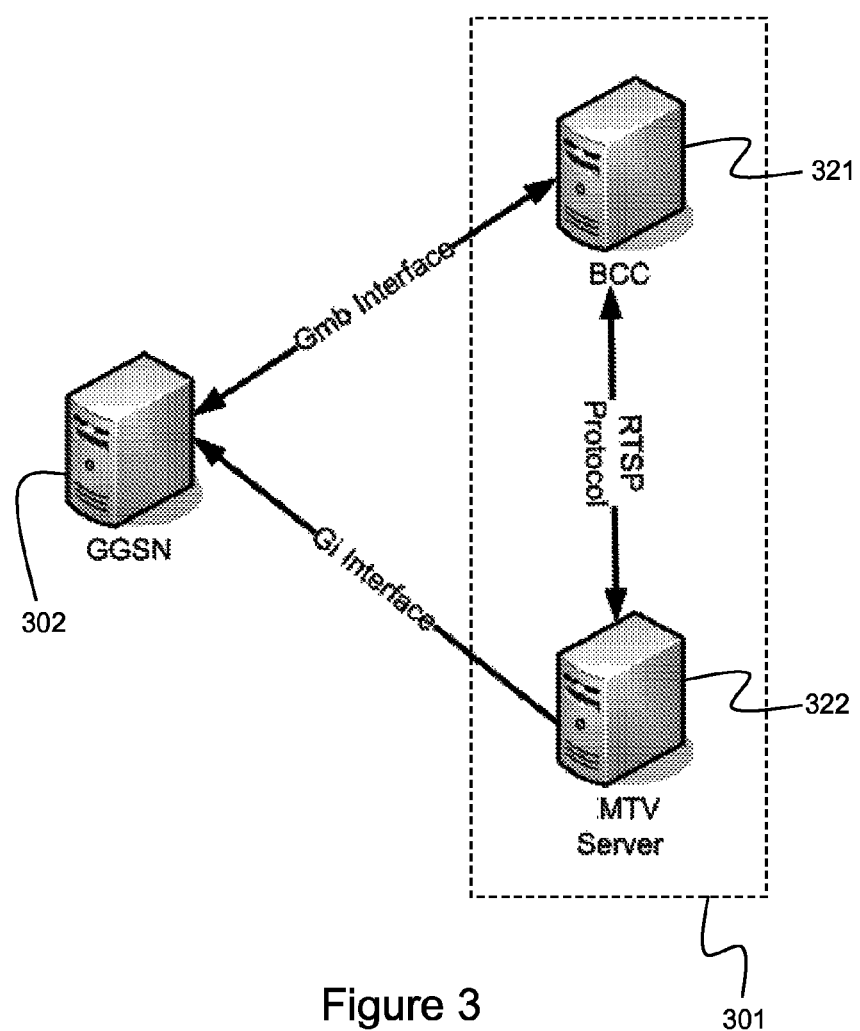
FIG. 3 is a schematic illustration of a suitable architecture for a Broadcast/Multicast Service Centre (BM-SC).

In one suitable architecture for Mobile TV, the BM-SC has separate components for handling signalling and data traffic, as illustrated in FIG. 3. A BM-SC 301 includes a Broadcast Controller (BCC) 321 and Mobile TV server (MTV Server) 322. The BCC 321 is responsible for exchanging signalling with a GGSN 302 across the Gmb signalling interface using the Diameter protocol, designed for MBMS Broadcast session establishment and management. The MTV server is responsible for sending traffic towards the GGSN 302 over the Gi interface, designed for MBMS data delivery. The interface between the BCC 321 and MTV server 322 uses the RTSP protocol.

In order to set up a multicast, the RTSP SETUP method is used. The Transport header indicates which transport protocol is to be used, and configures parameters such as destination address, compression, multicast time-to-live and destination port for a single stream. Those values are not determined by the presentation description.

If there are GGSNs which already support IP multicast, the BCC 321 could use the transport header to convey multicast information as the following:

BCC->MTV: SETUP rtsp://live.example.com/concert/audio RTSP/1.0
CSeq: 2
Transport: RTP/AVP;multicast;destination=224.2.0.1;
port=4002-4003;ttl=16

MTV->BCC: RTSP/1.0 200 OK
CSeq: 2
Transport: RTP/AVP;multicast;destination=224.2.0.1;
port=4002-4003;ttl=16
Session: 0456804596

BCC->MTV: SETUP rtsp://live.example.com/concert/video RTSP/1.0
CSeq: 3
Transport: RTP/AVP;multicast;destination=224.2.0.1;
port=4004-4005;ttl=16
Session: 0456804596

MTV->BCC: RTSP/1.0 200 OK
CSeq: 3
Transport: RTP/AVP;multicast;destination=224.2.0.1;
port=4004-4005;ttl=16
Session: 0456804596

BCC->MTV: PLAY rtsp://live.example.com/concert RTSP/1.0
CSeq: 4
Session: 0456804596

MTV->BCC: RTSP/1.0 200 OK
CSeq: 4
Session: 0456804596

It can be seen from this that, in the two SETUP requests, the BCC 321 informs the MTV Server 322 of the multicast destination address (224.2.0.1), port numbers for audio streams (4002-4003) and video streams (4004-4005) and time to live information (16), using the Transport header.

After receiving a PLAY request, The MTV Server 322 responds with a "200 OK" and then delivers multicast IP packets directly to the GGSN 302. In this case, the RTSP fits the needs of setting up a multicast session very well.

As has been previously discussed, in some cases, the GGSN may not support multicast operations. Therefore another option has been proposed in 3GPP release 7 to address this situation. IP multicast packets may be encapsulated inside IP unicast packets by the BM-SC for sending towards the GGSN. This is known as IP-in-IP and is described in IETF RFC 2003.

Even if the GGSN does not have IP multicast support, it can receive a unicast IP packet, remove the unicast wrapper to recover the encapsulated multicast packet, and then forward the multicast packet to a SGSN. The MBMS Broadcast can still therefore operate as previously proposed. The only difference is that the traffic between the BM-SC and GGSN is unicast delivery (with inner multicast packets).

However, in the RTSP as currently defined, the streaming channel can be set up either as unicast or as multicast. It has not previously been possible to request the media server to send out multicast packets encapsulated inside a unicast tunnel.

Therefore, if there are some GGSNs which do not support multicast, the BCC 321 needs to supply to the MTV Server 322 not only the multicast related information (multicast address), but also the unicast tunnel destination information of the GGSN (e.g. the GGSN 302).

To convey both multicast and unicast transport information, some specific RTSP extension is needed. In the Mobile TV solution, the Transport header is used to convey the multicast information as normal, and an extension header called X-GGSN is introduced. In the X-GGSN header, the destination unicast address is contained.

The following is an example of RTSP signalling for this scenario:

```
BCC->MTV:    SETUP rtsp://live.example.com/concert/audio RTSP/1.0
             CSeq: 2
             Transport: RTP/AVP;multicast;destination=224.2.0.1;
                 port=4002-4003;ttl=16
             X-GGSN: 150.236.42.5
MTV->BCC:    RTSP/1.0 200 OK
             CSeq: 2
             Transport: RTP/AVP;multicast;destination=224.2.0.1;
                 port=4002-4003;ttl=16
             Session: 0456804596
BCC->MTV:    SETUP rtsp://live.example.com/concert/video RTSP/1.0
             CSeq: 3
             Transport: RTP/AVP;multicast;destination=224.2.0.1;
                 port=4004-4005;ttl=16
             X-GGSN: 150.236.42.5
             Session: 0456804596
MTV->BCC:    RTSP/1.0 200 OK
             CSeq: 3
             Transport: RTP/AVP;multicast;destination=224.2.0.1;
                 port=4004-4005;ttl=16
             Session: 0456804596
BCC->MTV:    PLAY rtsp://live.example.com/concert RTSP/1.0
             CSeq: 4
             Session: 0456804596
MTV->BCC:    RTSP/1.0 200 OK
             CSeq: 4
             Session: 0456804596
```

It will be noted that, in addition to the multicast destination address (224.2.0.1), audio and video port numbers (4002-4003 and 4004-4005) and time to live information (16) included in the Transport header, the SETUP messages now include the X-GGSN extension header, which provides the unicast destination address (150.236.42.5) of the GGSN 302.

In this example, once the PLAY request has been received, the MTV server 322 responds to the BCC 321 with a "200 OK" message, encapsulates the multicast IP packets into unicast IP packets, and then delivers the unicast IP packets to the destination address 150.236.42.5 described in the X-GGSN header.

Figure 4:
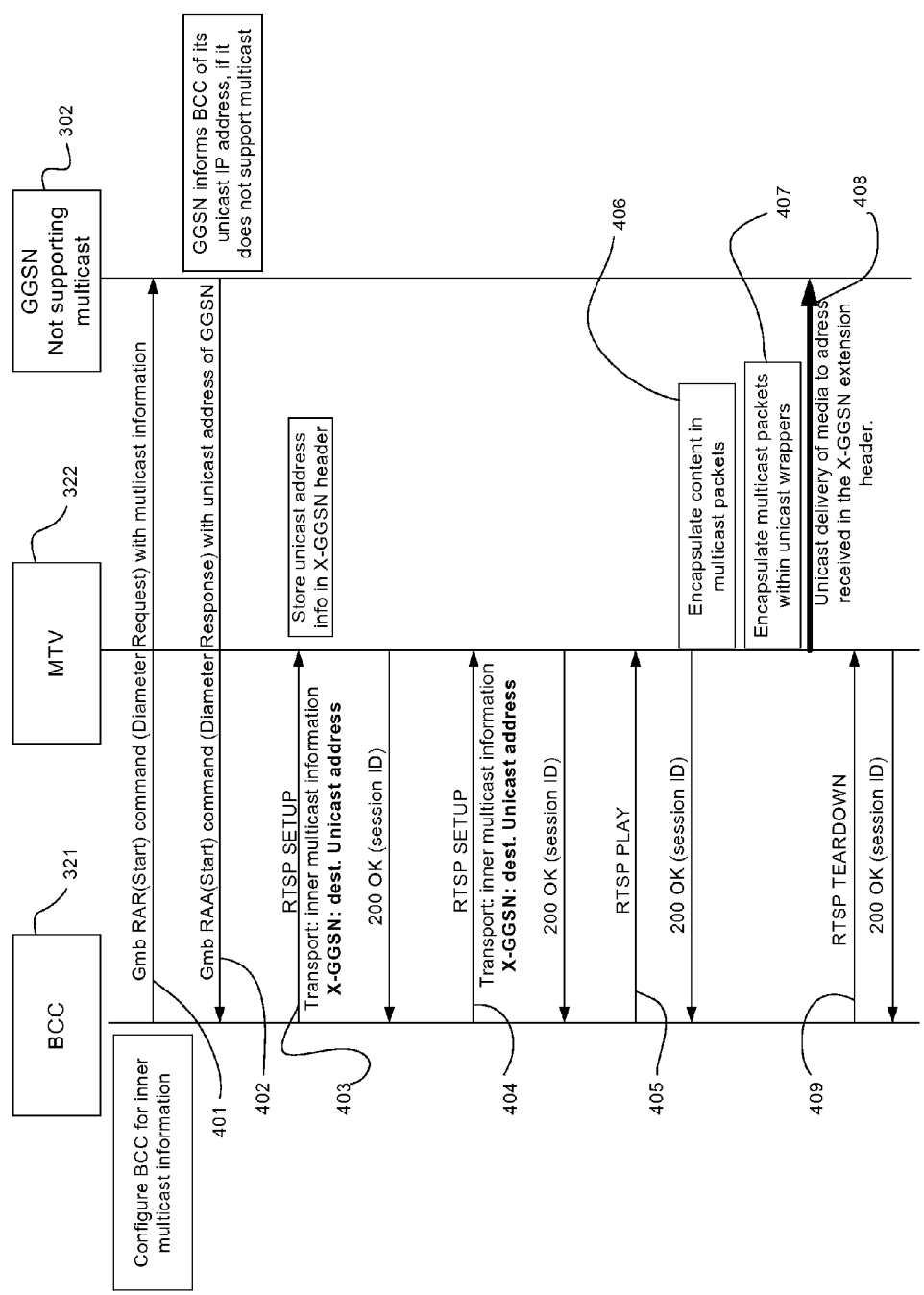
FIG. 4 is a signalling diagram illustrating the steps required to configure a BM-SC to encapsulate multicast IP packets within unicast IP packets and set up a multicast session when a GGSN does not support multicast.

FIG. 4 is an illustration of the steps required to configure a BM-SC to encapsulate multicast IP packets within unicast IP packets, and set up a multicast session where the GGSN does not support multicast. The steps are as follows:

401: A Diameter Re-Auth-Request (RAR) (Start) command is sent from the BCC 321 to the GGSN 302. Using this command, the BCC 321 instructs the GGSN 302 and further downstream nodes in the cellular network to activate MBMS bearer resources.

402: A Diameter Re-Auth-Answer (RAA) (Start) response is returned from the GGSN 302 to the BCC 321. Through the RAA response, the GGSN 302 informs the BCC 321 whether or not it supports multicast. If multicast is not supported, (as in this case) its unicast IP address to receive media streams is also be included.

403: A RTSP SETUP message is sent from the BCC 321 to the MTV server 322 to set up one stream (e.g. an audio stream). As described above, the SETUP message includes the multicast destination address, together with the IP unicast address of the GGSN as the X-GGSN header. The MTV 322 returns a 200 OK response.

404: Another RTSP SETUP message is sent from the BCC 321 to the MTV 322 to set up another stream (e.g. a video stream), including the multicast destination address and GGSN IP unicast address. The MTV 322 returns a further 200 OK response.

405: A RTSP PLAY message is sent from the BCC 321 to the MTV server 322. The MTV 322 returns a 200 OK response.

406: The MTV server 322 encapsulates media content into multicast packets.

407: The multicast packets are then encapsulated within IP unicast packets.

408: The IP unicast packets are delivered from the MTV server 322 to the GGSN 302.

409: At termination of the session, BCC 321 sends a RTSP TEARDOWN message to the MTV server 322.

Internet

A similar system can also be used for multicast packets delivered over the Internet. As with Mobile TV, the RTSP protocol is also widely used for the session management between clients and streaming servers on the Internet.

In most cases, data streams are delivered in unicast mode, no matter whether they are video-on-demand or live streams. For live streams, since all the receivers are expected to receive the same content, it would be more efficient if they could be delivered in multicast mode. The multicast of such packets would save bandwidth in the traffic path, and would also reduce the load of the streaming server.

However, if multicast delivery is to be carried out over the Internet, it requires that all of the routers in the traffic path have multicast support. Furthermore, it requires that operators' firewall ports are opened for incoming multicast packets. For security reasons, some firewalls disable the receiving of multicast packets.

IP multicast is typically more widely used in local networks (LAN) than throughout the whole Internet. It is therefore realistic to consider a solution similar to that described above for Mobile TV. A unicast stream could be delivered from a streaming server to a LAN gateway. Inside the LAN, the contents of the unicast could then be delivered as multicast.

Following the approach suggested by 3GPP release 7, it is possible for a media server to encapsulate IP multicast packets within unicast packets. A gateway node could then take off the unicast wrapper and multicast the packets in a local network. Multicast packets could then be sent across the Internet whether or not intervening routers provide multicast support. Furthermore, the efficiency inherent in multicast could still be achieved, as only one delivery channel will be required from a media server towards a gateway node, which would then multicast the packets to all clients.

Under this proposal, the same problem as for mobile TV exists on the RTSP signalling interface. Under the RTSP as currently defined, the gateway node cannot ask a media server to send out multicast packets encapsulated inside a unicast tunnel.

The implementation of such functionality and deployment requires a gateway node, hereinafter referred to as a Multicast2Unicast GW, having two main functionalities:

1. In the signal plane, the Multicast2Unicast GW establishes RTSP sessions on behalf of clients in the LAN towards a streaming server;
2. In the traffic plane, the Multicast2Unicast GW converts unicast IP packets to multicast IP packets and streams the multicast packets towards clients in the LAN. A streaming server should encapsulate multicast IP packets in unicast IP packets, and the Multicast2Unicast GW takes off the unicast IP "wrapper" and multicasts the inner multicast IP packets directly.

Figure 5:
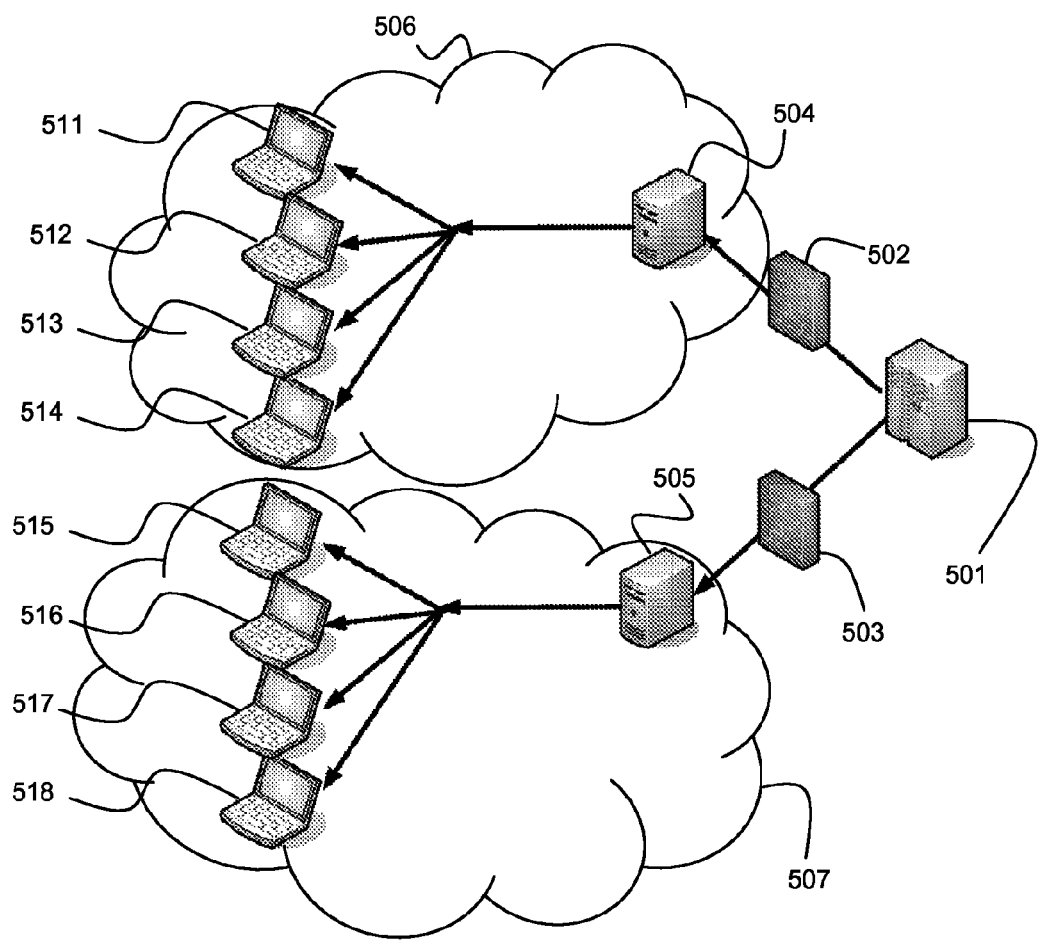
FIG. 5 is a schematic representation of some nodes of the Internet, showing the delivery of multicast packets to two LANs.

This can be understood with reference to FIG. 5, which is a schematic representation of some nodes of the Internet, showing the delivery of multicast packets to two LANs 506, 507. Each LAN includes a Multicast2Unicast GW 504, 505 and four terminals 511-518. A firewall 502, 503 protects each Multicast2Unicast GW 504, 505. A streaming server 501 sends multicast IP packets encapsulated within unicast "wrappers" to the Multicast2Unicast GWs 504, 505. The Multicast2Unicast GWs 504, 505 recover the multicast packets from the unicast wrappers and forward them as a multicast to the terminals within their own LANs. The unicast packets sent from the streaming server 501 can pass through routers which are not multicast enabled, and can also pass through the firewalls 502, 503.

In the current RTSP protocol, the traffic must be delivered in either unicast mode, or multicast mode. No mechanisms have previously been provided to ensure that the streaming server can be instructed to encapsulate multicast packets to unicast ones.

It is therefore proposed to extend the RTSP protocol in a similar manner to that described above in the context of Mobile TV. Under RTSP as currently used, the gateway IP address and port number are conveyed in the Transport header, so that an RTSP-aware firewall will allow traffic to pass through. The extension of RTSP involves conveying the multicast destination address, port number and time-to-live information in an extension header. In the following example, the extension header is labelled "X-Multicast-Transport".

| | |
|---|---|
| GW->SS: | SETUP rtsp://live.example.com/concert/audio RTSP/1.0 |
| | CSeq: 2 |
| | Transport: RTP/AVP;unicast;client_port=3456-3457 |
| | X-Multicast-Transport: destination=224.2.0.1; |
| |     Port=4002-4003;ttl=16 |
| SS->GW: | RTSP/1.0 200 OK |
| | CSeq: 2 |
| | Transport: RTP/AVP;unicast;client_port=3456-3457; |
| |     server_port=5000-5001 |
| | X-Multicast-Transport: destination=224.2.0.1; |
| |     Port=4002-4003;ttl=16 |
| | Session: 0456804596 |
| GW->SS: | SETUP rtsp://live.example.com/concert/video RTSP/1.0 |
| | CSeq: 3 |
| | Transport: RTP/AVP;unicast;client_port=3458-3459 |
| | X-Multicast-Transport: destination=224.2.0.1; |
| |     Port=4004-4005;ttl=16 |
| | Session: 0456804596 |
| SS->GW: | RTSP/1.0 200 OK |
| | CSeq: 3 |
| | Transport: RTP/AVP;unicast;client_port=3456-3457; |
| |     server_port=5002-5003 |
| | X-Multicast-Transport: destination=224.2.0.1; |
| |     Port=4004-4005;ttl=16 |
| | Session: 0456804596 |
| GW->SS: | PLAY rtsp://live.example.com/concert RTSP/1.0 |
| | CSeq: 4 |
| | Session: 0456804596 |
| SS->GW: | RTSP/1.0 200 OK |
| | CSeq: 4 |
| | Session: 0456804596 |

Thus, in the case of Mobile TV, the RTSP SETUP messages convey the unicast GGSN destination address in addition to the previously known multicast destination address. In the case of the Internet, the RTSP SETUP messages convey the multicast destination address and port numbers in addition to the previously known Gateway unicast destination address.

Thus the Multicast2Unicast Gateway 504, 505 must send and receive RTSP messages in the signalling plane on behalf of the clients 511-518 in its local network. When a client wishes to subscribe to a multicast stream, it may send a "Join" request using, for example, the Internet Group Management Protocol (IGMP) or Multicast Listener Discovery (MLD). The Multicast2Unicast Gateway is then responsible for sending SETUP and PLAY requests. When all the clients served by a particular Multicast2Unicast Gateway stop receiving (for example by sending IGMP or MLD Leave messages), the gateway is responsible for sending a TEARDOWN request.

Once the multicast streams have been requested, multicast IP packets are encapsulated within unicast wrappers by the streaming server and sent to the Multicast2Unicast Gateway. In the traffic plane, the Multicast2Unicast Gateway must take off these unicast IP wrapper and multicast the inner IP packets to the clients in its LAN.

Figure 6:
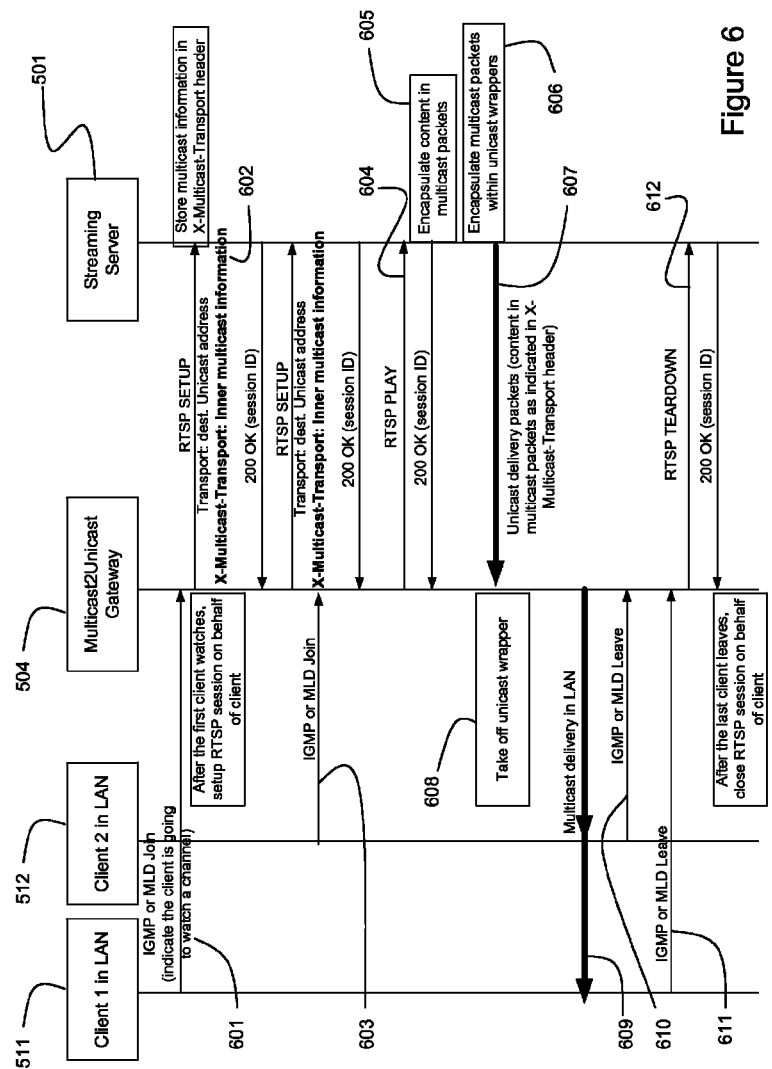
FIG. 6 illustrates the signalling between components involved in the delivery of an IP multicast stream from a streaming server to client terminals when at least some gateway nodes do not support multicast.

FIG. 6 illustrates the signalling between some of the components shown in FIG. 5 involved in the delivery of a multicast stream from the streaming server 501 to first and second client terminals 511, 512 in the LAN 506 served by the Multicast2Unicast GW 504. The steps are as follows:

601: The first client 511 sends an IGMP or MLD Join command to the Multicast2Unicast Gateway 504, indicating that the first client is going to watch a channel.

602: The Multicast2Unicast Gateway 504 sends two RTSP SETUP messages to the streaming server 501, requesting multicast packets encapsulated in a unicast wrapper. As described above, the RTSP SETUP messages include both the multicast details and the unicast address of the Multicast2Unicast Gateway 504.

603: In this example, the second client 512 also sends an IGMP or MLD Join command to the Multicast2Unicast Gateway 504 to subscribe to the same channel as the first client 511. The setup signalling already taking place between the Multicast2Unicast Gateway 504 and the streaming server 501 is not affected by the second Join command.

604: Once the session has been set up, the Multicast2Unicast Gateway 504 sends a RTSP PLAY message to the streaming server 501, instructing the start of the streaming.

605: The streaming server 501 puts content in multicast packets.

606: The multicast packets are encapsulated within IP unicast packets.

607: The streaming server sends the IP unicast packets to the Multicast2Unicast Gateway 504.

608: The Multicast2Unicast Gateway 504 extracts the multicast packets from their unicast wrappers.

609: The Multicast2Unicast Gateway 504 forwards the multicast packets to the first and second client terminals 511, 512.

610: The second client terminal 512 decides to stop watching the channel and sends an IGMP or MLD Leave command to the Multicast2Unicast Gateway 504. Since the first client terminal 511 is still subscribed to the channel, no action is taken by the Multicast2Unicast Gateway 504.

611: The first client terminal 511 decides to stop watching the channel and sends an IGMP or MLD Leave command to the Multicast2Unicast Gateway 504. In this example, this is the last client in the LAN 506 to leave the channel.

612: Once the last client has left the channel, the Multicast2Unicast Gateway 504 sends a RTSP TEARDOWN message to the streaming server 501 to close the RTSP sessions on behalf of the clients.

Figure 7:
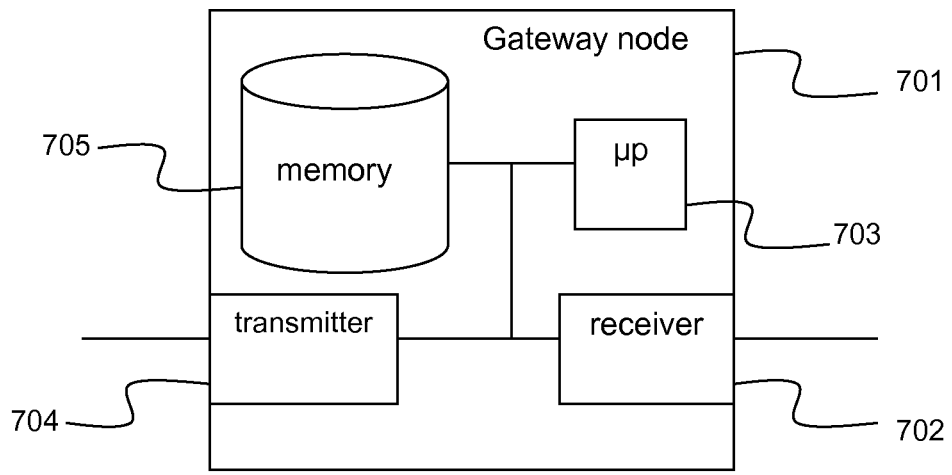
FIG. 7 is a schematic representation of a gateway node capable of setting up the delivery of streaming IP multicast packets encapsulated within unicast packets.

FIG. 7 is a schematic representation of a gateway node 701 for providing an IP multicast service, which could be a Multicast2Unicast Gateway 504 of the type described with reference to FIGS. 5 and 6. The gateway node includes a receiver 702 for receiving instructions in the signal plane from client terminals within a local network to subscribe to a multicast. A microprocessor 703 processes these instructions and initiates RTSP setup signalling to be sent towards a streaming server via a transmitter 704 to request multicast data packets encapsulated within a unicast wrapper. The microprocessor ensures that the setup signalling provides details of the multicast destination address, together with the unicast address of the node itself. On the traffic plane, when unicast packets are received from the streaming server, they are temporarily saved in the memory 705 while the microprocessor 703 removes the unicast wrapper to extract the multicast packets encapsulated therein. The multicast packets are then transmitted towards clients in the local network by the transmitter 704.

Figure 8:
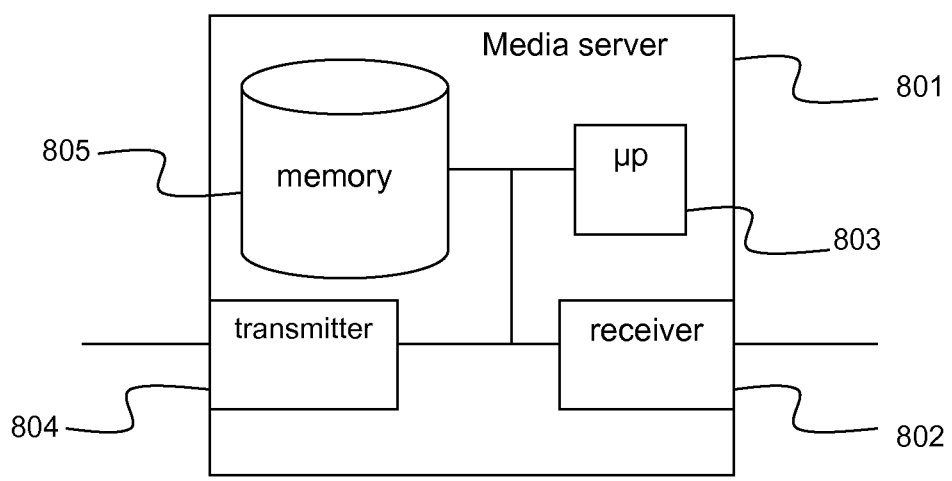
FIG. 8 is a schematic representation of a media server capable of encapsulating IP multicast packets within unicast packets and sending them towards a gateway.

FIG. 8 is a schematic representation of a media server 801 for providing an IP multicast service, which could be an MTV server 322 of the type described with reference to FIGS. 3 and 4, or a streaming server 501 of the type described with reference to FIGS. 5 and 6. The media server 801 includes a receiver 802 for receiving instructions in the signal plane, either from a BCC 321 or a Multicast2Unicast Gateway 504, to send multicast packets encapsulated within unicast wrappers. The instructions will contain details of the multicast destination address, together with the unicast address of the gateway node to which the unicast packets should be sent. A microprocessor 803 processes these instructions and encodes content (e.g. stored in memory 805) within multicast packets, and then encapsulates the multicast packets within unicast wrappers. A transmitter 804 sends the unicast IP packets on the traffic plane over the local network towards the gateway node.

It will be appreciated that variations from the above described embodiments may still fall within the scope of the invention. For example, one possible architecture of a BM-SC has been described, but it will be appreciated that other architectures may also be suitable. Furthermore, the delivery of multicast packets over the Internet has been described with particular reference to a gateway node delivering multicast packets within a LAN. It will be appreciated that other arrangements may be envisaged.

Furthermore, the invention has been described generally with reference to possible extensions to the RTSP protocol. It will be appreciated that the signalling required to set up the delivery of multicast packets encapsulated in unicast wrappers could also be carried out using other protocols. For example, the signalling could be carried out using the Session Initiation Protocol (SIP).

Although various embodiments have been shown and described in detail, the claims are not limited to any particular embodiment or example. None of the above description should be read as implying that any particular element, step, or function is essential such that it must be included in the claims' scope. The scope of protection is defined by the claims.

The invention claimed is:

1. A method of controlling the delivery of multicast media in a network in which at least some nodes do not support delivery of multicast packets, the method comprising:
   sending a Real Time Streaming Protocol (RTSP) message to a media server to request the media server to send multicast packets, encapsulated within unicast wrappers, to a gateway node in the network;
   wherein the request includes details of a multicast destination address, and details of a unicast destination address of the gateway node.

2. The method of claim 1, wherein the details of the multicast destination address and gateway node unicast destination address are included in the header of the request.

3. The method of claim 1, wherein the media server is a streaming server in an IP network, and wherein the request to the streaming server is sent by the gateway node.

4. The method of claim 3, wherein the gateway node unicast destination address is included in a Transport header of the request, and the multicast destination address is included in an extension header of the request.

5. The method of claim 1, wherein the media server is a traffic handling component of a Broadcast/Multicast Service Center (BM-SC), the request is sent by a signal handling component of the BM-SC, and the gateway node is a Gateway GPRS Support Node (GGSN).

6. The method of claim 5, wherein the multicast destination address is included in a Transport header of the request, and the gateway node unicast destination address is included in an extension header of the request.

7. The method of claim 1, further comprising:
   at the media server, encoding streaming data in multicast packets having the multicast destination address;
   encapsulating the multicast packets within unicast wrappers to form unicast packets having the gateway node unicast destination address;
   sending the unicast packets to the gateway node;
   at the gateway node, removing the unicast wrappers to recover the multicast packets; and
   sending the multicast packets towards the multicast destination address.

8. A gateway node for delivering IP multicast data in a network, comprising:
   a receiver for receiving instructions from client terminals to subscribe to a multicast channel;
   a processor operatively connected to the receiver and configured to generate a Real Time Streaming Protocol (RTSP) message to a streaming server to request multicast packets encapsulated within unicast wrappers, the request including details of a multicast destination address and a unicast destination address of the gateway node; and
   a transmitter operatively connected to the processor and configured to send the request towards the streaming server.

9. The gateway node of claim 8, wherein the gateway node is further configured to:
   receive unicast packets containing multicast packets encapsulated within unicast wrappers;
   recover the multicast packets from the unicast packets; and
   send the recovered multicast packets towards the multicast destination address.

10. A signal handling component of a Broadcast/Multicast Service Center (BM-SC), comprising:
    a receiver for receiving instructions from a Gateway GPRS Support Node (GGSN) to set up multicast streaming delivery to a multicast destination address;
    a processor operatively connected to the receiver and configured to generate a request to a Mobile TV server component of the BM-SC for multicast packets encapsulated within unicast wrappers to be sent to the GGSN, the request including details of a multicast destination address and the unicast destination address of the GGSN; and
    a transmitter operatively connected to the processor and configured to send the request towards the Mobile TV server.

11. The signal handling component of claim 10, configured so that the request sent to the Mobile TV server is a Real Time Streaming Protocol (RTSP) message.

12. A media server for delivering multicast streaming media data, comprising:
- a receiver for receiving a Real Time Streaming Media (RTSP) request to send multicast packets encapsulated within unicast wrappers towards a gateway node, the request including details of a multicast destination address, and of a unicast destination address of the gateway node;
- a processor configured to encode the media data in multicast packets and encapsulate the multicast packets within unicast wrappers as unicast packets; and
- a transmitter configured to send the unicast packets towards the gateway node.

13. The media server of claim 12, which media server is a streaming server in an IP network, and wherein the request is received from the gateway node.

14. The media server of claim 12, which media server is a traffic handling component of a Broadcast/Multicast Service Center (BM-SC), and wherein the request is received from a signal handling component of the BM-SC.

* * * * *